United States Patent [19]

Adachi

[11] Patent Number: 5,076,689

[45] Date of Patent: Dec. 31, 1991

[54] OFF AXIS MIRROR ALIGNMENT

[75] Inventor: Iwao P. Adachi, Westminster, Calif.

[73] Assignee: Rockwell International, El Segundo, Calif.

[21] Appl. No.: 676,013

[22] Filed: Mar. 27, 1991

[51] Int. Cl.$^5$ ............................................. G01B 11/27
[52] U.S. Cl. .................................... 356/127; 356/153; 356/354; 356/363; 356/374
[58] Field of Search .............................. 356/124–127, 356/153, 353, 354, 363, 374

[56] References Cited

U.S. PATENT DOCUMENTS 3,471,237  10/1969  Hall .................................... 356/153

Primary Examiner—F. L. Evans
Attorney, Agent, or Firm—H. Fredrick Hamann; George A. Montanye; Gregory D. Ogrod

[57] ABSTRACT

An apparatus and method are disclosed for increasing the alignment accuracy for off-axis mirrors in which a circular phase grating is illuminated from behind onto the mirror to be aligned creating a reflected image of the grating. The circular grating is aligned with the reflected image produced by the mirror so as to create at interference pattern when observed along an observation axis which is an approximate mirror optical axis. The generated or observed interference pattern is observed for the presence of moire lines and the mirror is translated or rotated about the observation axis until moire lines are minimized in, or disappear from, the observed interference pattern. The observation axis is then aligned with the optical axis of the mirror which can be recorded or marked. In further embodiments of the invention, the fringe pattern is transferred, using one or more lenses, to an image processing element such as a camera. The image can be digitized and transferred to a process controller which is coupled to position translators connected to the mirror under test. The process controller analyzes the observed fringes and moves the mirror until a desired minimum number of moire lines are present.

19 Claims, 6 Drawing Sheets

OFF AXIS MIRROR ALIGNMENT

BACKGROUND OF THE INVENTION

1. Field of the Invention

The present invention relates to optical systems and more particularly to a method and apparatus for aligning the optical axis of mirrors. The invention further relates to optical alignment of off axis a spherical or non-circularly symmetric mirrors.

2. Related Technical Art

High quality reflective mirrors are used in a variety of advanced optical applications such as image scanners or sensors, image duplication, or image digitizing systems. In high resolution optical systems the mirrors must possess high quality optical surfaces and be very accurately aligned to provide a desired high resolution or high image registration. Therefore, it is necessary to provide methods of manufacturing mirrors with very precisely defined focal patterns and that are capable of high accuracy alignment within a given optical system. The alignment process may include system alignment, but also includes initial alignment of the mirror within a mounting structure for later use.

When flat, circular, or circularly symmetric mirrors are employed it is often simple to align the mirrors by simply using a mechanical measurement of the focal point of the mirror. The size and circular curvature of such mirrors are easy to measure, and from this the focal point or axis is also easily determined. Light beams can also be reflected from the mirror surface and observed to see where a common intersection point of reflected light is or to trace predetermined patterns. Another method is to rotate the mirror while reflecting a collimated light beam or an image from its surface and adjust the mirror's axis of rotation until the reflected image is stationary. To achieve very high accuracy alignment requirements, a variety of interferometric techniques can also be used to detect mis-alignment using incident and reflected light beams and images. However, when dealing with a spherical or parabolid shapes or more complex geometries and offset mirrors, the traditional interferometric methods do not work well.

For mirrors in which there is no circular central portion, the physical structure of the mirror prevents very accurate determination of the focal axis or makes this axis very hard to locate. In this arrangement there is no central portion from which to easily reflect a beam of light or an image. One method of alignment is to assume that any zonal error is concentric or symmetric about the central optical axis if alignment is perfect. An interferogram is used to detect or focus to a mirror zone, which is then used to establish the optical axis. Likewise, Ronchi tests can be used to find a pattern passing a mirror zone. Several tests can be performed to observe several portions of the mirror surface and then be compiled to establish a single, composite, optical axis. However, these methods have been found to be in error by as much as twenty percent.

Unfortunately, off set mirrors and mirrors having complex surface shapes are needed for highly advanced optical systems. Therefore, what is needed is a method and apparatus for providing highly accurate alignment of such mirrors. At the same time, a new mirror alignment technique is needed that provides very accurate measurement of mirror alignment for a variety of mirror configurations. It is also desirable for any alignment technique to be usable with a minimum of expense and complication.

SUMMARY

In view of the limitations of the current mirror alignment techniques in the art, one purpose of the invention is to provide a new technique for aligning off axis mirrors.

Another purpose of the invention is to provide a highly accurate method of aligning off ax's or geometrically complex mirrors.

It is an advantage of the invention that mirror alignment is provided with a minimum of complexity.

Another advantage of the present invention is that it lends itself to automation of some alignment procedures.

These and other purposes, objects, and advantages are realized in a method and apparatus for aligning off-axis mirrors in which a circular phase grating is illuminated from behind onto the mirror to be aligned creating a reflected image of the grating. The circular grating is aligned with the reflected image produced by the mirror so as to create at interference pattern when observed along an observation axis which is an approximate mirror optical axis. The generated or observed interference pattern is observed for the presence of moire lines and the mirror is translated or rotated about the observation axis of until the number of moire lines are minimized in, or disappear from, the observed fringe pattern. At this point, the observation axis is aligned with the optical axis of the mirror which can be recorded or marked.

In further embodiments of the invention, the fringe pattern is transferred, using one or more lenses, such as a null lens assembly, to an image processing element such as a camera. The image can be digitized and transferred to a process controller which is coupled to position translators connected to the mirror under test. The process controller until a desired minimum number of moire lines are present. The process controller can be preprogrammed to provide position translation commands to movable mounting devices for the mirror. The fringe information can also be recorded or stored for later recall or analysis.

BRIEF DESCRIPTION OF THE DRAWINGS

The novel features of the present invention may be better understood from the accompanying description when taken in conjunction with the accompanying drawings in which like numbers refer to like elements throughout and in which:

FIG. 5 illustrates a compiled optical axis pattern based on a series of images like those of FIG. 4a.

DETAILED DESCRIPTION OF THE PRESENT INVENTION

The present invention provides a method and apparatus for aligning off axis mirrors very accurately and efficiently. The invention accomplishes this alignment by projecting an image of a circular Ronchi grating onto the mirror surface and then reflecting the grating image onto the original grating. The Ronchi grating is adjusted along an observation axis to coincide with the reflected image and the resulting moire interference pattern observed for moire lines. The mirror is moved and rotated about the observation axis to minimize moire lines in the interference pattern and establish the optical axis for the mirror along the observation axis.

Figure 1:
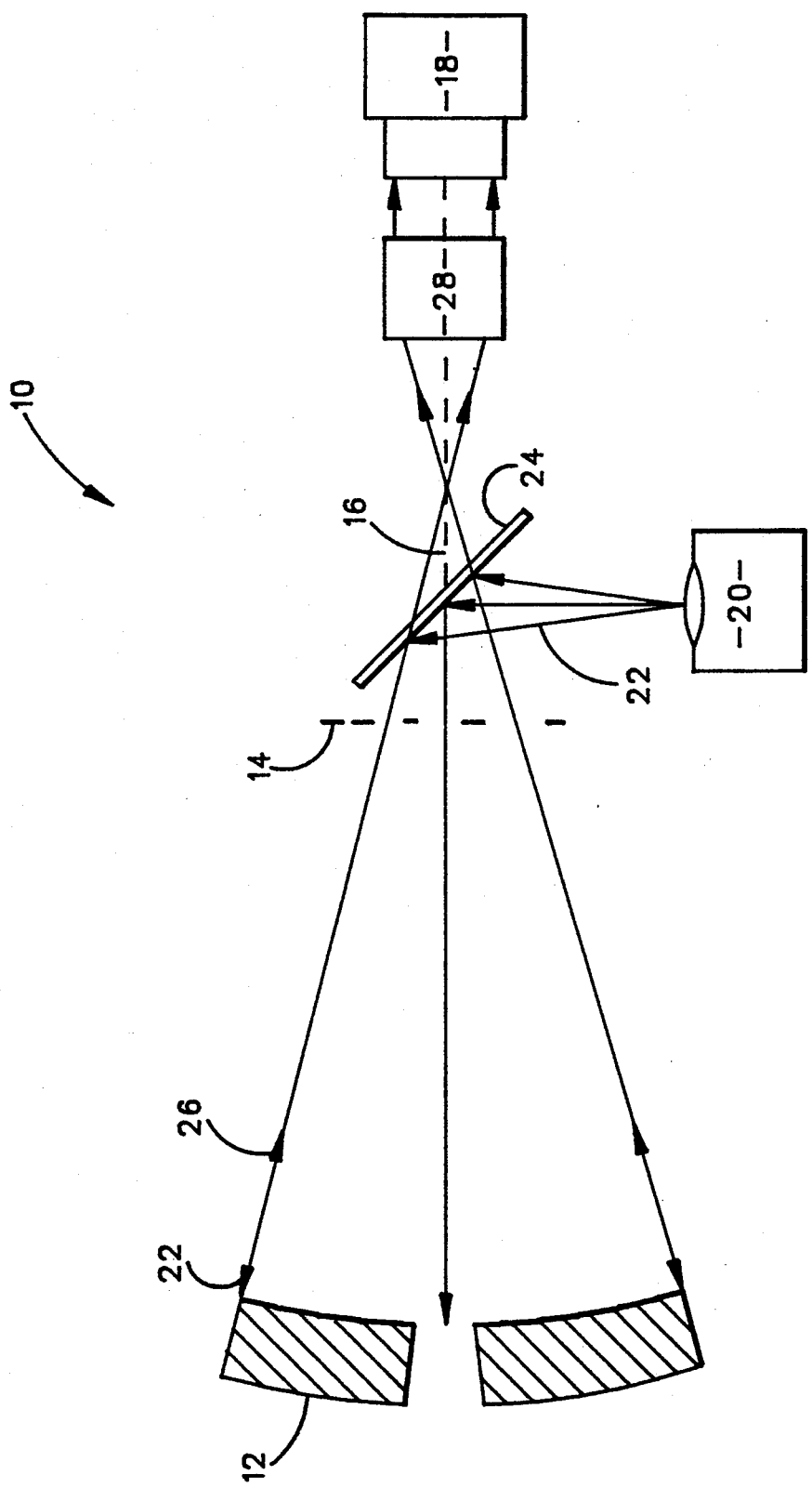
FIG. 1 illustrates an overview of an apparatus for aligning an off axis mirror constructed and operating according to the present invention.

The apparatus used for the alignment technique of the present invention is illustrated in schematic form in FIG. 1. In FIG. 1, an optical alignment system 10 is shown for determining the central optical alignment axis for an off-set mirror 12. The mirror 12 can comprise one of a variety of off-set mirror designs known to those skilled in the art and the one illustrated in FIG. 1 is presented for purposes of clarity and not as a limitation on the inventive technique.

A circular Ronchi grating 14 is positioned along an observation axis 16 between an observation element 18 and the mirror 12. The observation element can comprise an unaided human eye for initial alignment of the apparatus 10. For instance, an unaided eye can typically detect a circular moire fringe at a distance when observing two overlapping circular gratings. However, for highly accurate alignment, the observation element will include at least a lens system for observing fine moire fringes and generally an electro-optical device such as a charge-coupled device type camera or video system. This latter type of device allows both improved observation and recording of mirror characteristics which can be cataloged with the mirror 12.

The precise size of the circular grating 14 and reflector 24 depend, on their placement along the mirror focal path and the size of the mirror images created, as would be known to those skilled in the art.

An optical source 20, such as but not limited to, a diode laser is used to project an illuminating beam 22 onto an optical reflector or reflection element 24 and onto the mirror 12. The reflector 24 can comprise one of several known elements such as an optical flat, prism, or other compound reflection apparatus. The optical source 20 is selected to typically provide spectrally pure and coherent light to provide a strong centrally focused light source and reduce scatter. For this reason a laser-type light source is preferred for this application but other highly collimated optical sources may also prove suitable for achieving the advantages of the invention.

The light source 20 is also chosen to operate at a preselected frequency or in a desired frequency range depending upon the application of the mirror 12. Those skilled in the art will readily recognize that the optical frequency is based on the optical characteristics of the mirror, or its intended applications, and the level of accuracy desired, distances or angles to measure. At the same time, any reflective or partially reflective coatings used in the alignment system 10, such as on the reflector 24, are chosen to enhance operation at the frequency of the optical source 20.

The grating 14 is configured as a circular Ronchi phase grating for the frequency of light being used. An exemplary grating for operation at a light wavelength 680 nm is about 0.333 mm grating periodicity. The circular grating 14 is positioned across the observation axis 16 in the general optical focal path of the mirror 12 between the reflector 24 and the mirror 12. The circular grating 14 is positioned substantially perpendicular to the observation axis, which represents an approximation of the optical axis of the mirror 12.

A variety of circular gratings can be used to realize the present invention but some may prove more useful than others for very highly accurate alignment. Various types of circular gratings are used in the art and many are useful in achieving the advantages of the present invention. However, the deep etch type of Ronchi grating has been found to provide a high contrast, highly sensitive. fringe generating element. The black and white type of Ronchi grating provides a good but decreased contrast response and the phase type Ronchi grating typically provides a poor contrast lower response image. Therefore, the deep etch circular Ronchi grating is preferred.

The input light beam 22 reflects off of the reflector 24 and passes through the circular grating 14 and strikes the surface of the mirror 12 where it forms an image of the grating 14. This image is reflected out along the optical axis of the mirror 12 as a light beam 26 where it is observed by the observation element 18.

Figure 2A:
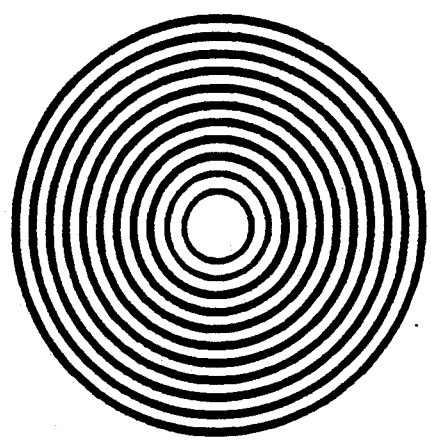
FIGS. 2a2c illustrate an exemplary fringe pattern for the apparatus of FIG. 1 using a deep etch type grating.
Figure 2B:
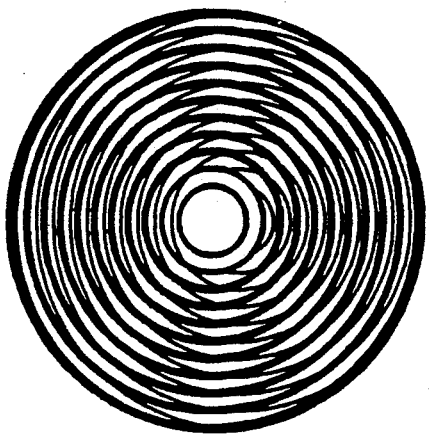
Figure 2C:
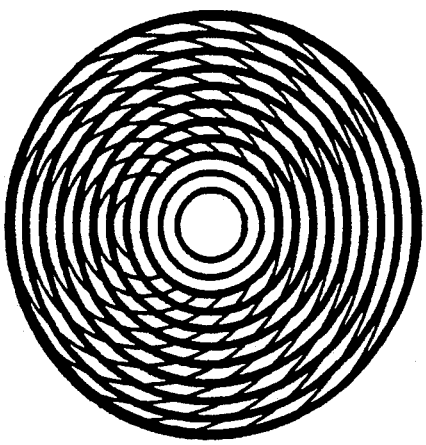

The circular grating 14 is adjusted along the approximated optical axis 16 until it is in the same location as the focused image 26 of the grating, or interferes with the image. This interference produces one or more types of moire fringe patterns as shown in FIGS. 2a through 2c. The fringe patterns illustrated in FIGS. 2a through 2c were obtained using an exemplary embodiment with observations and photographic recording. The figures represent measurements of the interference of a 0.33 mm period circular grating with its image as reflected from a six inch diameter mirror having a three inch circular aperture or non-reflective central body portion and an approximate focal distance of about 20 inches. A light wavelength of about 680 nm was used.

The sensitivity of the inventive technique will vary according to the direction and magnitude of displacement of the off-axis mirror from the observation axis. That is, whether the displacement occurs along the mirror axial lines, or is horizontal or vertical to the observation axis. The contours or variations in the shape of the mirror surfaces will also effect sensitivity to some degree. Those skilled in the art will readily appreciate how these factors impact alignment in a given application.

To obtain the fringe pattern illustrated in FIG. 2a the returned grating image and the grating are perfectly aligned, within the accuracy of the system. and only the circular grating is observed. If the mirror 12 is misaligned in a horizontal direction from the chosen observation axis 16 by a small amount, on the order of 0.19 milliradians, then the pattern of FIG. 2b is observed which shows three lines of moire interference. As the mirror 12 is further misaligned from the axis 16, to about 0.38 milliradians off-axis, the moire fringe pattern now exhibits eight lines as seen in FIG. 2c. It is easily seen that both a high degree of accuracy and visibility of presentation is obtained for alignment errors.

Once a mirror is aligned with the observation axis, the circular grating and reflected image are aligned. resulting in the fringe pattern of FIG. 2a. Once this condition is achieved, the optical axis of the mirror is known and can be marked or otherwise indicated through the use of a physical element attached to the mirror or a mounting element supporting the mirror. Where desired, one or more transfer or null lenses 28 can also be inserted along the observation axis 16 between the observation element 18 and the reflector 24 to enhance the image or lengthen the observation path.

While the above technique greatly advances the art, many offset mirrors are not amenable to having their entire surface observed as a single image. That is, many off-set mirrors are very large and the technique as described would require an excessively large observation device or very long observation path length, to capture an entire surface image 26. To accommodate larger mirrors, the technique of the invention can be directed to smaller portions or quadrants of the mirror and the results compiled to provide the alignment information. An illustration of this approach is provided in the apparatus of FIG. 3 and the fringes of FIGS. 4a through 4c and FIG. 5.

Figure 3:
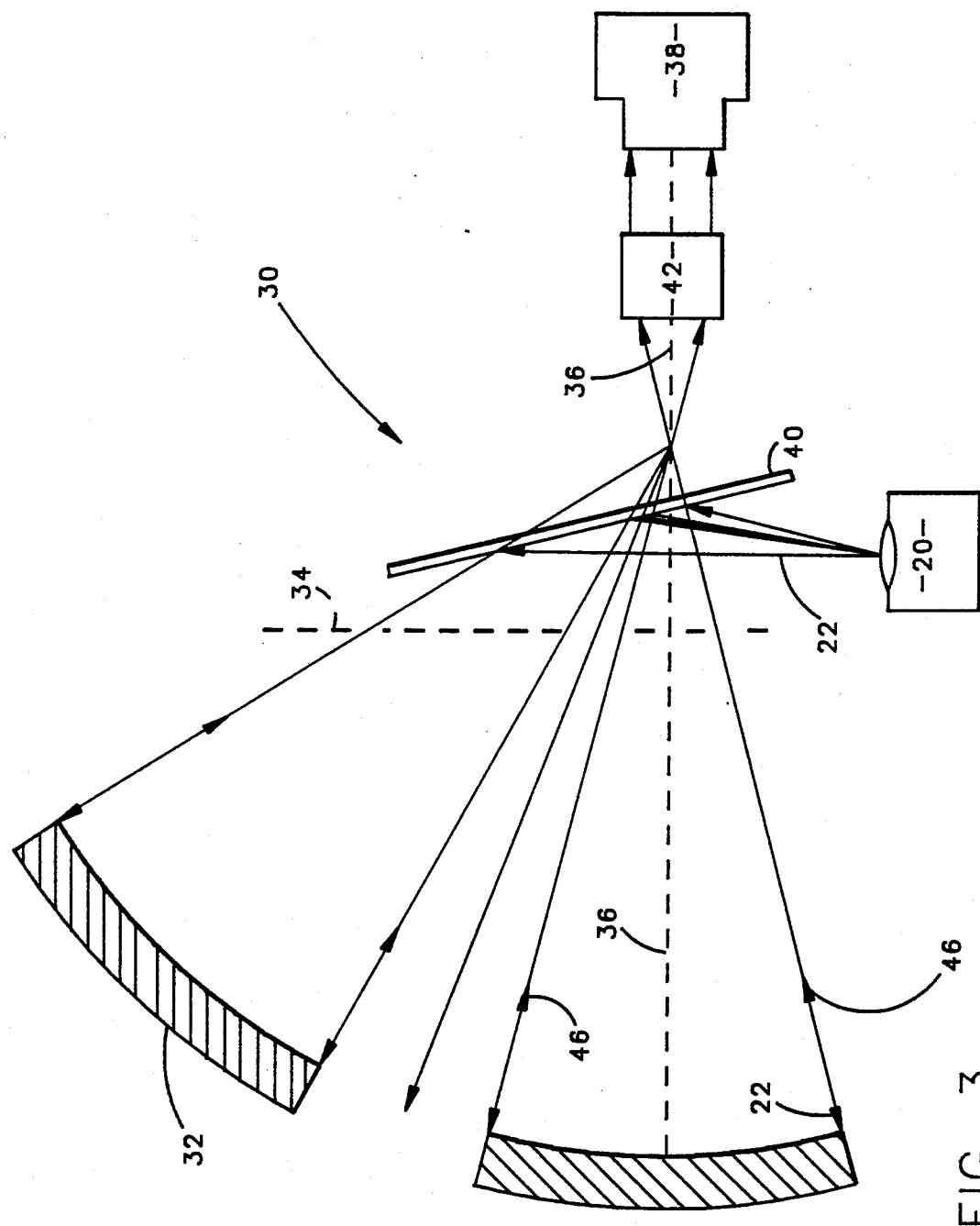
FIG. 3 illustrates the application of four quadrant scanning for large off axis mirrors to construct an alignment axis.

In FIG. 3, an alignment system 30 is configured to test and align large mirrors 32 using a circular grating 34 and reflector 40 positioned along an observation axis 36 which is directed to the viewing element 38. As before, one or more lenses or null lens devices 42 can be used to enhance or collimate the images being observed. In this embodiment. the circular grating 34 and reflector 40 are larger in order to project light onto the entire mirror surface and receive the entire returned image. The precise size of the circular grating 34 and reflector 40 depend, as before, on their placement along the mirror focal path, as would be known to those skilled in the art.

The light source 20 projects a light beam 22 onto the back of the circular grating 34 which advances to the mirror 32 and is reflected as an image of the grating on the mirror 32 which is reflected as an image beam 46. In this application, the observation element 38 only observes one portion of the fringe pattern established by the interference of the reflected image 46 with the circular grating 34. The results are similar to those of FIG. 2 and are presented in FIGS. 4a through 4e. The fringe patterns illustrated in these figures were obtained using the exemplary embodiment used for FIG. 2 with the exception of observing smaller portions of the reflected image and generated fringe patterns.

Figure 4A:
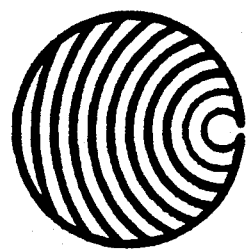
FIGS. 4a-4f illustrate an exemplary fringe pattern for the apparatus of FIG. 3.
Figure 4D:
Figure 4B:
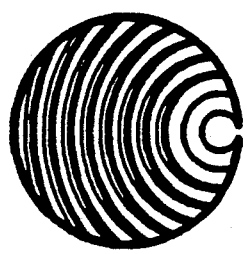

FIGS. 4a and 4d illustrate the fringe patterns for when the mirror 32 is aligned with the observation axis 36, and no moire lines are visible. To obtain the fringe patterns shown in FIG. 4b, the mirror 32 was displaced about 0.32 milliradians in a horizontal direction from the observation axis 36 and for the fringes of FIG. 4c the displacement was increased to about 0.64 milliradians. In this particular application, using a very smooth and symmetrical mirror surface, the alignment apparatus 30 is not very sensitive to this horizontal displacement. Only a couple of moire lines are visible in FIG. 4c.

Figure 4E:
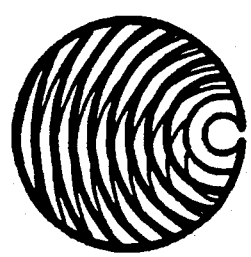
Figure 4C:
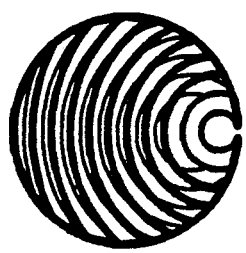
Figure 4F:
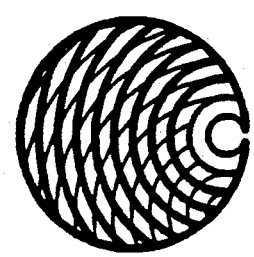

However, when the mirror 32 is moved vertically at a displacement of about 0.19 milliradians as for FIG. 4e and the displacement is increased to about 0.38 milliradians as for FIG. 4f, the changes are more noticeable. In this direction, the change in surface angle for the mirror 32 is much more pronounced and the alignment apparatus 30 appears more sensitive because of this. In FIG. 4e, at least three moire lines are visible and in FIG. 4f the number of lines increases to six.

For the fringe patterns of FIGS. 4a through 4f, only a portion of the circular Ronchi grating and reflected image are being observed. Therefore, the grating patterns appear paraboloid rather than circular. The eccentricity of the paraboloid grating patterns depend on the size of the mirror 32 being tested and the size of the image being observed. These patterns can be measured and the information combined to determined the location of the mirror 32 optical axis and align that axis with a desired observation or test axis.

Figure 5:
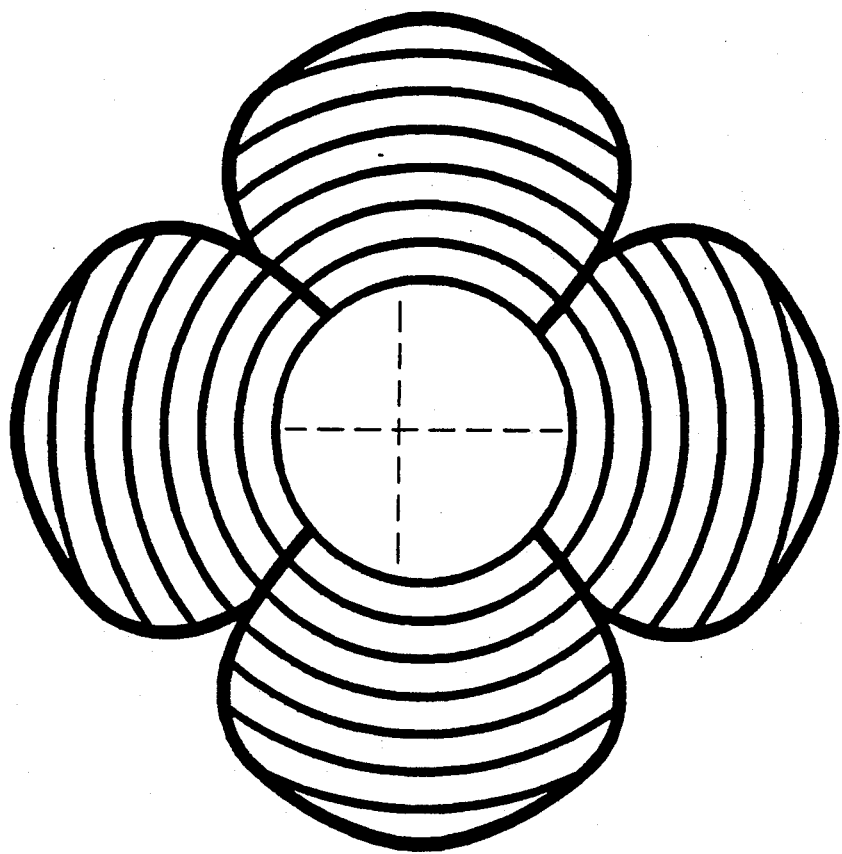

This part of the technique is implemented as illustrated in FIG. 5. In FIG. 5, a series of at least four Ronchi test patterns are observed and recorded as done for FIG. 4, although real time measurements can also be used without photographic recording. Each successive grating or fringe pattern is typically no more than one quadrant or 90 degrees removed from an adjacent pattern. That is. the observation axis is displaced radially about the approximated mirror optical axis, to which it is parallel, to several different positions which are separated by 90 degrees of arc or less. The lower this separation and the higher the number of samples used, the more accurate the determination of the mirror 32 optical axis.

The center of each paraboloid fringe in these samples can be approximated by physical measurement. The samples can be positioned relative to each other in accordance with their respective angular displacements from each other when positioned radially about a fixed axis. By positioning the sample fringes relative to each other and projecting a central axis location, an overall mapping and corresponding optical axis for the mirror 32 is obtained.

Figure 6:
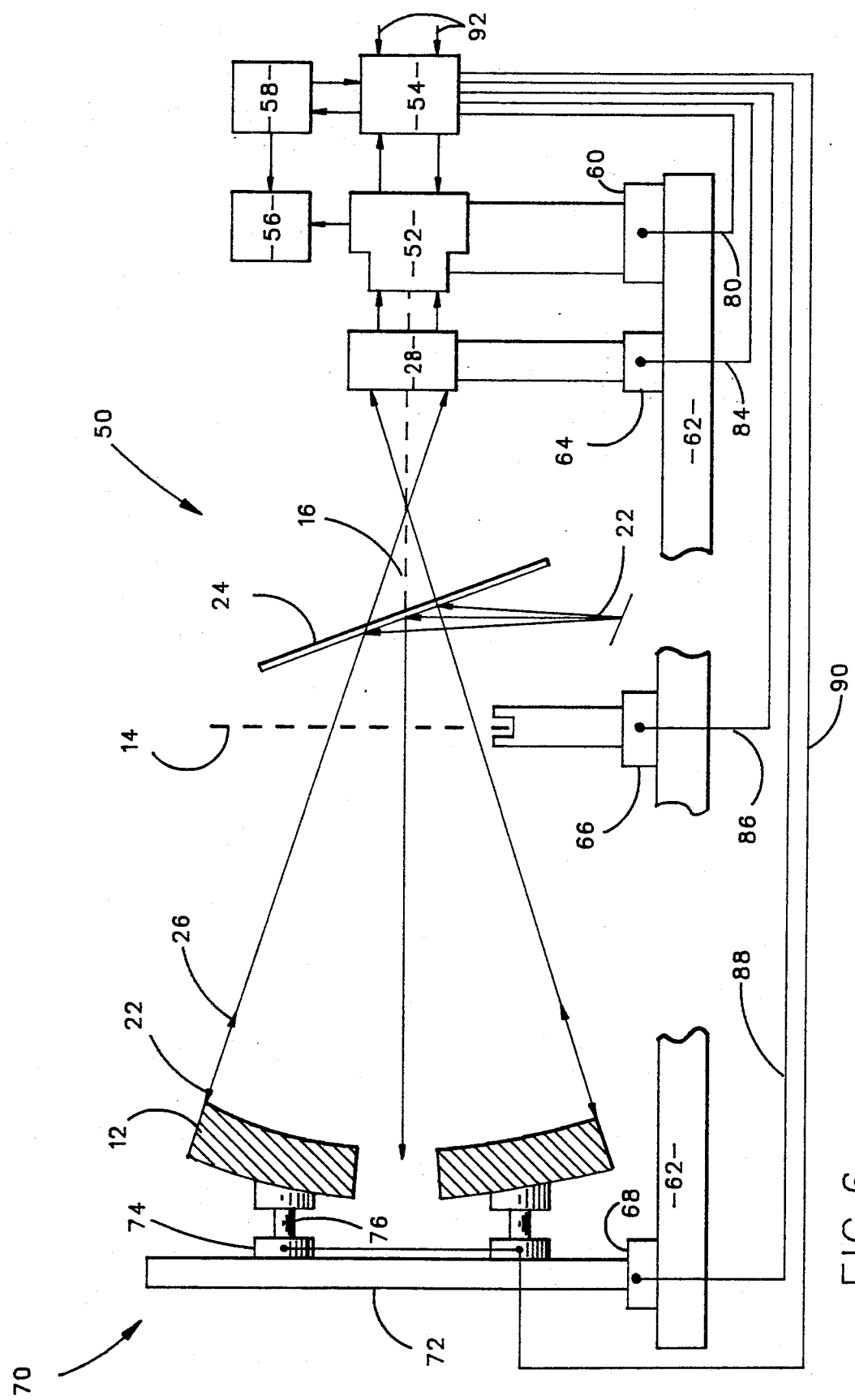
FIG. 6 illustrates an automation system for performing the method of the present invention.

While the above description discloses the advantages of the present invention. further improvement may be made by automating or electronically controlling part of the alignment process. FIG. 6 illustrates an application of computer or electronic control to the alignment process.

In FIG. 6. an electronically controlled or controllable alignment apparatus 50 is shown in which the mirror 12 is again tested and adjusted using a light source, not shown, to provide the input beam 22 off of the reflector 24 and through the circular grating 14. The image of the grating, 26, is reflected by the mirror 12 and observed by an imaging device 52. The device 52 is an electronic imaging device or system such as, but not limited to, a charge coupled device type camera. The imaging device 52 provides, as an electronic signal, a digital signal output which represents a digitized version of the observed fringe patterns. This information is transferred through a data bus, cable, or connectors to a process controller 54.

The camera is typically mounted on a movable actuator or position translation element 60 which is in turn mounted on a support element 62. The translator 60 can be one of many known electro-mechanical devices such as a step motor or solenoid which can be operated using an input control signal. The translator 60 adjusts the position of the imaging device 52 relative to other parts of the apparatus 50 where appropriate. The support 62 is a relatively fixed reference frame for the alignment apparatus 50 components and can be a device such as an optical bench or a specially aligned support rail assembly. Those skilled in the art are familiar with this type of device. The lens assembly 28 is also mounted on a position translator 64 for fine adjustments in relative position as necessary.

The circular grating 14 is secured to a position translator 66 and the mirror 12 is mounted on a horizontal position translator 68. The translator 68 generally acts as a movable support platform for a vertical position translator assembly 70 having a vertical support element 72 with one or more vertical translators 74 which move along the support element 72. The mirror 12 is secured to the translators 74 by elements such as mounting posts 76 which can further employ individually movable actuators or rotation elements to independently move different portions of the mirror 12 for alignment. Those skilled in the art will readily recognize that these translation components are illustrative of the devices found useful for achieving the operation of the invention and that there are other, often more complex, actuators and multiple-axis-of-freedom mounting systems which are useful in constructing the invention. It is only necessary that position translation devices be employed that are readily controllable though the application of control signals, including power or pulse width adjustable signals, or digital commands.

Each of the position translation drivers or actuators is typically connected to receive position correction signals or commands along a signal bus. This bus can also represent a bi-directional data channel which provides some positional information to the process controller 54 from the various components, such as through resistive or electro-mechanical sensors, etc. The position translators 60, 64, 66, 68, and 70 are shown being connected to the processor 54 through the command signal lines 80, 84, 86, 88, and 90, respectively.

The process controller represents one of many known devices for effecting control over motors and similar actuators by issuing command signals. The signals can be analog or digital control signals depending upon the type of translators or actuators employed. An exemplary process controller 54 comprises a digital computer having internal memory for storing predetermined control programs which respond to received image data and provide adjustments to the position of the mirror to create the minimum number of moire lines. The process controller can employ additional memory or storage elements 58 for storing the image data or for compiling templates and known image selection criteria for determining the number of moire lines present in a received image. At the same time, human operator signals can be received through input lines 92 to help select or control operation of the process controller 54 or to select or implement programs for its operation.

A test mirror structure of known optical alignment is generally used to establish the initial positions of the circular grating, lenses, and imaging device. Once the initial configuration of the apparatus is verified, an off-set mirror of unknown alignment can be mounted on the mounting posts 76 and aligned to the observation axis of the imaging device 52. During processing, an image can be presented to a video screen 56 as well as the controller 54. The digitized image data is used to determine the presence of moire lines and the process controller 54 issues translation commands to the actuators 68 and 70 to realign the mirror and minimize the number of moire lines accordingly. The mirror can also be tilted relative to the observation axis 16 using appropriate translators or actuators mounted in series, with the mounting posts 76. This type of system is highly efficient for large mirrors since it can compute the central axis and intersection points for several paraboid measurements very quickly.

What has been described is a new technique for aligning off-set mirrors which provides for very accurate mirror alignment with a variety of mirror geometries, and is very efficient and economical to implement.

The foregoing description of preferred embodiments has been presented for purposes of illustration and description. It is not intended to be exhaustive nor to limit the invention to the precise forms disclosed, and many modifications and variations are possible in light of the above teaching. The embodiments were chosen and described to best explain the principles of the invention and its practical application to thereby enable others skilled in the art to best utilize the invention in various embodiments and with various modifications as are suited to the particular use contemplated. It is intended that the scope of the invention be defined by the claims and their equivalents.

What I claim as my invention is:

1. A method of determining the optical axis of an off-set mirror, comprising the steps of:
    projecting an image of a preselected circular Ronchi grating onto a reflective surface of said mirror for which an optical axis is to be determined;
    detecting a reflected image of said grating along an observation axis;
    positioning said circular Ronchi grating in a common focal plane with said reflected image so as to generate a moire fringe pattern of interference between said reflected image and said grating, and
    adjusting a physical orientation of said mirror relative to said observation axis so as to minimize moire lines in said moire fringes; whereby
    said observation axis becomes aligned with said desired mirror optical axis.

2. The method of claim 1, wherein said steps of projecting a grating image and positioning said grating, comprise the steps of:
    positioning a circular Ronchi grating transverse to and substantially centered about said observation axis;
    illuminating said circular grating from a side facing away from said mirror with a beam of light projected toward said mirror; and
    adjusting a lateral position of said circular Ronchi grating along said observation axis until an interference pattern is established with said reflected image.

3. The method of claim 2, wherein said adjusting step further comprises displacing said mirror at an angle with respect to said observation axis.

4. The method of claim 2, wherein said step of illuminating comprises the steps of:
    providing a laser diode operating at a preselected frequency as an optical light source; and
    positioning a light reflection element transverse to said observation axis which has at least one optical surface reflective of said laser diode light positioned to reflect said light against said circular grating, and is substantially transmissive of reflected light from said mirror.

5. The method of claim 1, further comprising the step of aligning said observation axis with a preselected approximation of said mirror optical axis prior to generating said fringe patterns.

6. The method of claim 1, wherein said adjusting step further comprises displacing said mirror at an angle with respect to said observation axis.

7. The method of claim 1, wherein said adjusting step further comprises observing at least two portions of said circular grating along separate observation axis for a fringe pattern;

displacing said mirror traverse with each of said observation axis to obtain a minimum number of moire lines; and projecting an optical axis position for each fringe pattern based on a geometric center for each fringe in each pattern.

8. The method of claim 1, wherein the step of adjusting further comprises the step of transferring an image to a camera.

9. The method of claim 8 further comprising the steps of:

digitizing said observed fringes in a charge coupled device type of camera;

electronically scanning said digitized fringes; and adjusting a relative position of said mirror with respect to said observation axis in response to moire lines being detected in said scanning step.

10. A method for aligning an optical axis of off-set mirrors, comprising the steps of:

providing a circular Ronchi grating along a preselected mirror observation axis;

illuminating said grating from one side and projecting an image of said grating on said mirror;

positioning said circular Ronchi grating in a common focal plane with a reflected image so as to generate a moire fringe pattern of interference between said reflected image and said grating;

adjusting a physical orientation of said mirror relative to said observation axis until moire lines in said fringes are minimized below a preselected level.

11. Apparatus for determining the optical axis of an off-set mirror, comprising:

a circular Ronchi grating of preselected periodicity positioned along a preselected observation axis along which said mirror reflective surface can be observed;

projection means for projecting an image of said circular grating onto a reflective surface of said mirror and onto said circular grating so as to generate a moire fringe pattern of interference between said reflected image and said grating; and translation means for adjusting a physical orientation of said mirror relative to said observation axis so as to minimize moire lines in said moire fringes, whereby said observation axis becomes aligned with said desired mirror optical axis.

12. The apparatus of claim 11, wherein said projection means comprises illumination means for illuminating said circular grating from a side facing away from said mirror with a beam of light projected toward said mirror.

13. The apparatus of claim 12, wherein said projection means comprises:

a laser diode operating at a preselected frequency as an optical light source; and a light reflection element positioned transverse to said observation axis which has at least one optical surface reflective of said laser diode light positioned to reflect said light against said circular grating, and is substantially transmissive of reflected light from said mirror.

14. The apparatus of claim 11, wherein said translation means further comprises displacement means for rotating said mirror at an angle with respect to said observation axis.

15. The apparatus of claim 14, wherein said translation means further comprises:

an electronic imaging means for detecting said fringes and moire lines therein; and control means for adjusting said displacement means in response to said detected fringes and lines.

16. The apparatus of claim 11, wherein said translation means further comprises an electronic imaging means for detecting said fringes and moire lines therein.

17. The apparatus of claim 16, wherein said electronic imaging means is focused to observe at least two separate portions of said circular grating along separate observation axis for a fringe pattern at preselected spaced apart intervals.

18. The apparatus of claim 17, further comprising construction means for computing a central axis position for each set of fringes observed at said at least two locations and for providing an average thereof.

19. The apparatus of claim 16, wherein said electronic imaging means comprises charge coupled device type camera.

* * * * *